United States Patent Office.

SYDNEY FERRIS WALKER, OF CARDIFF, ENGLAND.

GALVANIC BATTERY.

SPECIFICATION forming part of Letters Patent No. 361,794, dated April 26, 1887.

Application filed January 8, 1887. Serial No. 223,840. (No specimens.)

*To all whom it may concern:*

Be it known that I, SYDNEY FERRIS WALKER, of Cardiff, England, have invented an Improvement in Galvanic Batteries, of which the following is a specification.

My invention relates to an improved method of generating electrical currents for telegraphic and other purposes by means of a galvanic battery of approximately the form known as "Leclanché's;" and it is designed to give an economical current, to give notice when the battery is nearly worked out, and in which the exciting agent shall to a certain extent be reconstituted by the decomposition of the polarizing agent.

For the negative element of the cell, I take a porous pot, stand a capped carbon plate therein, and fill in the space around with a suitably-proportioned mixture of carbon and sulphur, both free from dust, pure, and crushed to pieces of the size of a pea or small bean, the cell being closed with pitch in the usual way. This filled porous cell is immersed in a solution of sal-ammoniac, common salt, sulphuric acid, or hydrochloric acid, zinc being the positive pole. The sulphur acts as a depolarizer and neutralizes the hydrogen gas delivered at the negative plate, forming sulphureted hydrogen. A series of reactions now take place, which I believe to be as follows, when the battery is excited by sal-ammoniac: First, the zinc combines with the chlorine and hydrogen with the sulphur; next, the zinc from the zinc chloride combines with sulphur from the sulphureted hydrogen, the hydrogen and chlorine liberated combining to form hydrochloric acid; next, the ammonia and hydrochloric acid combine to form sal-ammoniac. The zinc sulphide would fill the porous pot and stop the access of the sulphureted hydrogen to the zinc chloride, and then the sulphureted hydrogen will begin to come away and indicate by its odor when the battery is nearly worked out.

In place of packing with carbon and sulphur, I might form an agglomerate plate.

Having now particularly described and ascertained the nature of my said invention and in what manner the same is to be performed, I declare that what I claim is—

A galvanic cell in which sulphur and carbon suitably proportioned form the depolarizing agent, in combination with the other elements constituting a cell of the Leclanché type.

In testimony whereof I have signed my name to this specification in the presence of two subscribing witnesses.

SYDNEY FERRIS WALKER.

Witnesses:
SAM. P. WILDING,
RICHARD A. HOFFMANN.